(12) United States Patent
Lu et al.

(10) Patent No.: US 7,107,648 B1
(45) Date of Patent: Sep. 19, 2006

(54) HINGE

(75) Inventors: Sheng-Nan Lu, Shulin (TW); Hsiang-Chi Chien, Shulin (TW)

(73) Assignee: Shin Zu Shing Co., Ltd., Taipei Hsien (TW)

( * ) Notice: Subject to any disclaimer, the term of this patent is extended or adjusted under 35 U.S.C. 154(b) by 32 days.

(21) Appl. No.: 11/082,920

(22) Filed: Mar. 18, 2005

(51) Int. Cl.
*E05D 11/10* (2006.01)

(52) U.S. Cl. ....................................... 16/330
(58) Field of Classification Search ............... 16/330, 16/329, 319, 321, 334, 303, 372, 376, 326; 403/87, 91, 92, 118, 120; 455/90, 550, 556, 455/575; 361/681–683, 803; 379/433.13, 379/433, 428
See application file for complete search history.

(56) References Cited

U.S. PATENT DOCUMENTS

| | | | | |
|---|---|---|---|---|
| 1,416,656 A * | 5/1922 | Lyman | ......................... | 16/330 |
| 5,109,571 A * | 5/1992 | Ohshima et al. | ............... | 16/307 |
| 5,961,220 A * | 10/1999 | Som et al. | .................. | 384/416 |
| 6,070,298 A * | 6/2000 | Sorimachi | ..................... | 16/330 |
| 6,457,207 B1 * | 10/2002 | Horberg | ......................... | 16/50 |
| 6,530,121 B1 * | 3/2003 | Hayashi | ......................... | 16/330 |
| 6,772,481 B1 * | 8/2004 | Oshima et al. | ............... | 16/330 |
| 6,990,711 B1 * | 1/2006 | Koshikawa et al. | .......... | 16/334 |
| 2004/0181909 A1 * | 9/2004 | Kawamoto | .................... | 16/330 |
| 2005/0155182 A1 * | 7/2005 | Han et al. | ...................... | 16/336 |

* cited by examiner

Primary Examiner—Robert J. Sandy
Assistant Examiner—Andre' L. Jackson
(74) Attorney, Agent, or Firm—Rabin & Berdo, P.C.

(57) ABSTRACT

A hinge has a pin, a rotating positioning element and a stationary positioning element. The rotating positioning element is mounted around the pin and has a first, second, third and fourth detent and a rear surface with an inner circular area and an outer circular area. The first and second detents are formed in the inner circular area. The third and fourth detents are formed in the outer circular area. Each detent has a centerline. The centerlines of the first and third detents coincide. The centerlines of the second and fourth detents coincide. The stationary positioning element is mounted around the pin and has a first protrusion and a second protrusion. The first protrusion is formed on the stationary positioning element and selectively engages the first and second detents. The second protrusion is formed on the stationary positioning element and selectively engages the third and fourth detents.

6 Claims, 6 Drawing Sheets

HINGE

BACKGROUND OF THE INVENTION

1. Field of the Invention

The present invention relates to a hinge, especially to a hinge that has a capability to hold an object in a desired position.

2. Description of the Prior Arts

An appliance with a base and a cover has a hinge, for example foldable cellular phones. The hinge is mounted between the base and the cover to open or close the cover by pivoting the hinge. Many conventional hinges do not have a capability to hold the cover in a desired position, and the cover easily strikes the base. To keep the cover from striking the base, a positioning capability has been developed for some conventional hinges. However, the conventional hinges with a positioning capability can only hold the cover in position when the cover is closed.

To overcome the shortcomings, the present invention provides a hinge that can hold the cover in position when the cover is open to mitigate or obviate the aforementioned problems.

SUMMARY OF THE INVENTION

The main objective of the present invention is to provide a hinge that has a capability to hold a cover in position when the cover is open and closed. The hinge has a pin, a rotating positioning element and a stationary positioning element. The rotating positioning element is mounted around the pin and has a first, second, third and fourth detent and a rear surface with an inner circular area and an outer circular area. The first and second detents are formed in the inner circular area. The third and fourth detents are formed in the outer circular area. Each detent has a centerline. The centerlines of the first and third detents coincide. The centerlines of the second and fourth detents coincide. The stationary positioning element is mounted around the pin and has a first protrusion and a second protrusion. The first protrusion is formed on the stationary positioning element and corresponds to and selectively engages the first and second detents. The second protrusion is formed on the stationary positioning element and corresponds to and selectively engages the third and fourth detents.

Other objectives, advantages and novel features of the invention will become more apparent from the following detailed description when taken in conjunction with the accompanying drawings.

DETAILED DESCRIPTION OF THE PREFERRED EMBODIMENTS

Figure 1:
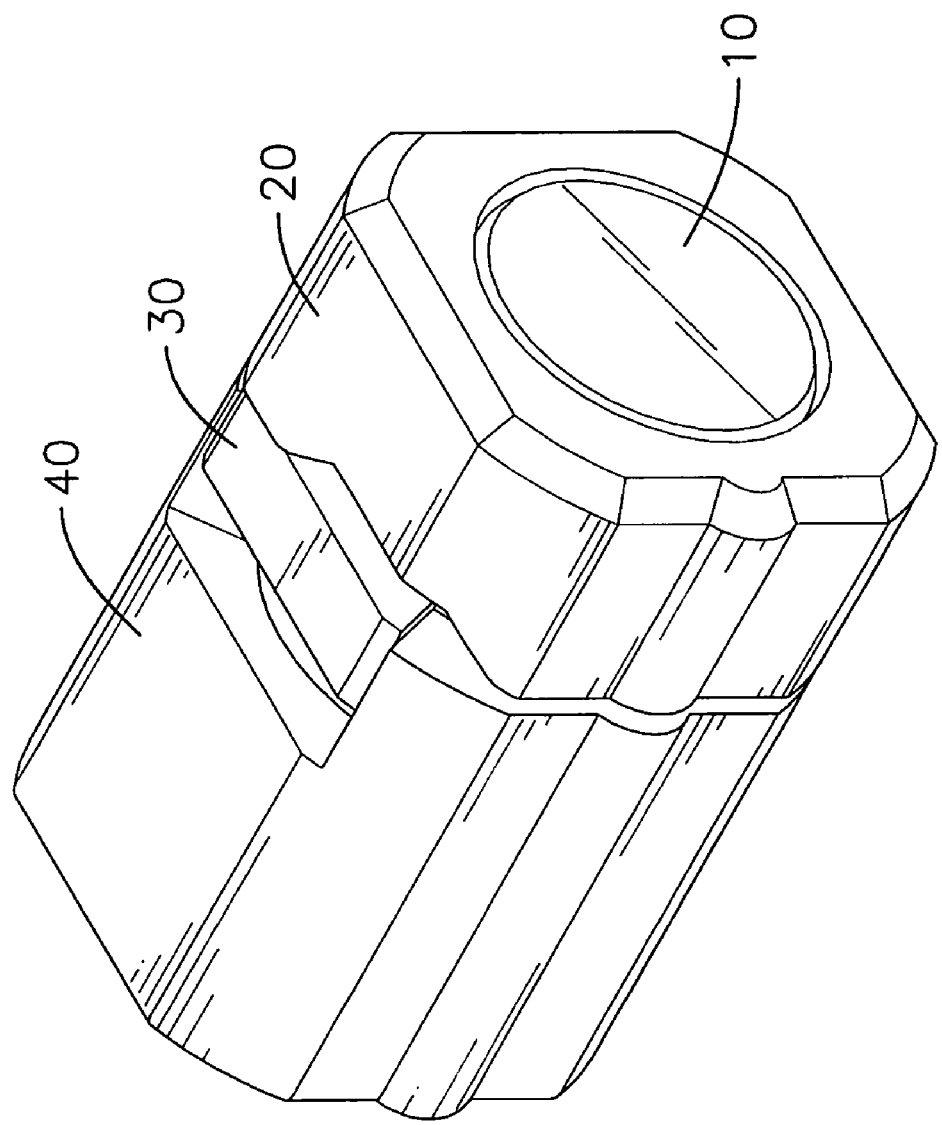
FIG. 1 is a perspective view of a hinge in accordance with the present invention.
Figure 2:
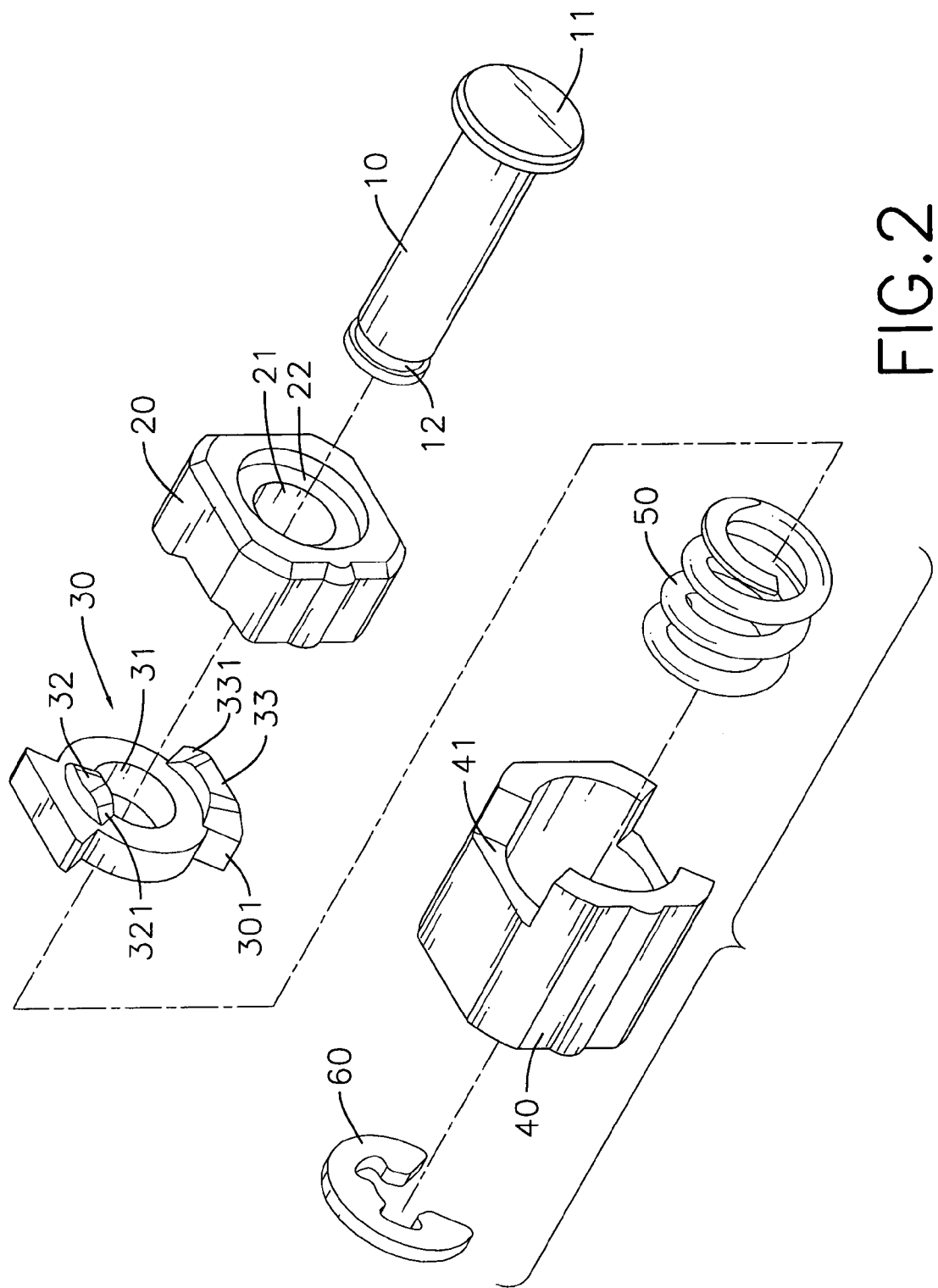
FIG. 2 is an exploded perspective view of the hinge in FIG. 1.

With reference to FIGS. 1 and 2, a hinge in accordance with the present invention comprises a pin (10), a rotating positioning element (20), a holder (40), a stationary positioning element (30), a spring (50) and an optional C-clip (60).

The pin (10) has a proximal end, a distal end, an optional head (11) and an optional annular groove (12). The head (11) is formed on the distal end. The annular groove (12) is formed around the pin (10) near the proximal end.

Figure 3:
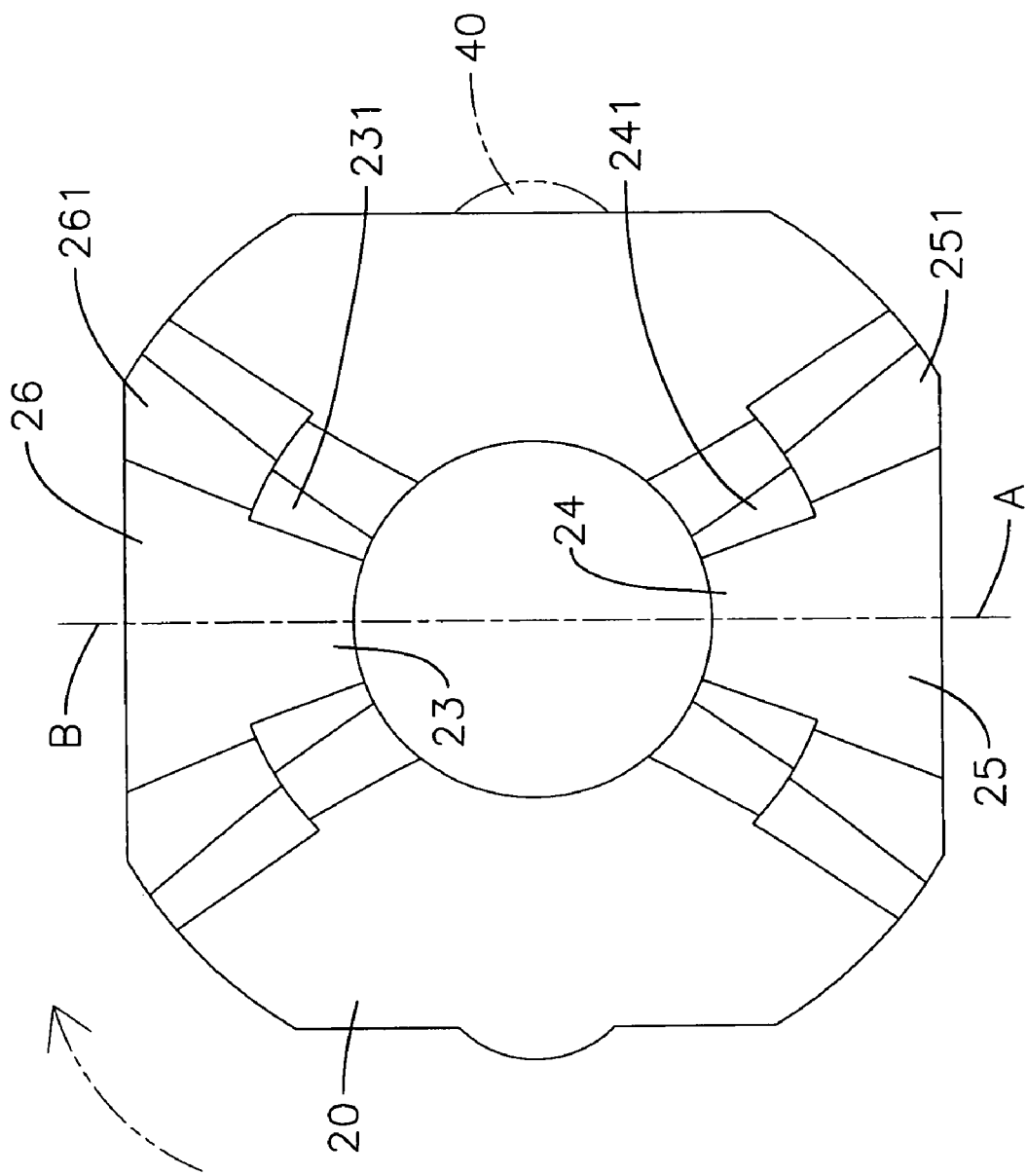
FIG. 3 is an end view of the hinge in FIG. 1.
Figure 4:
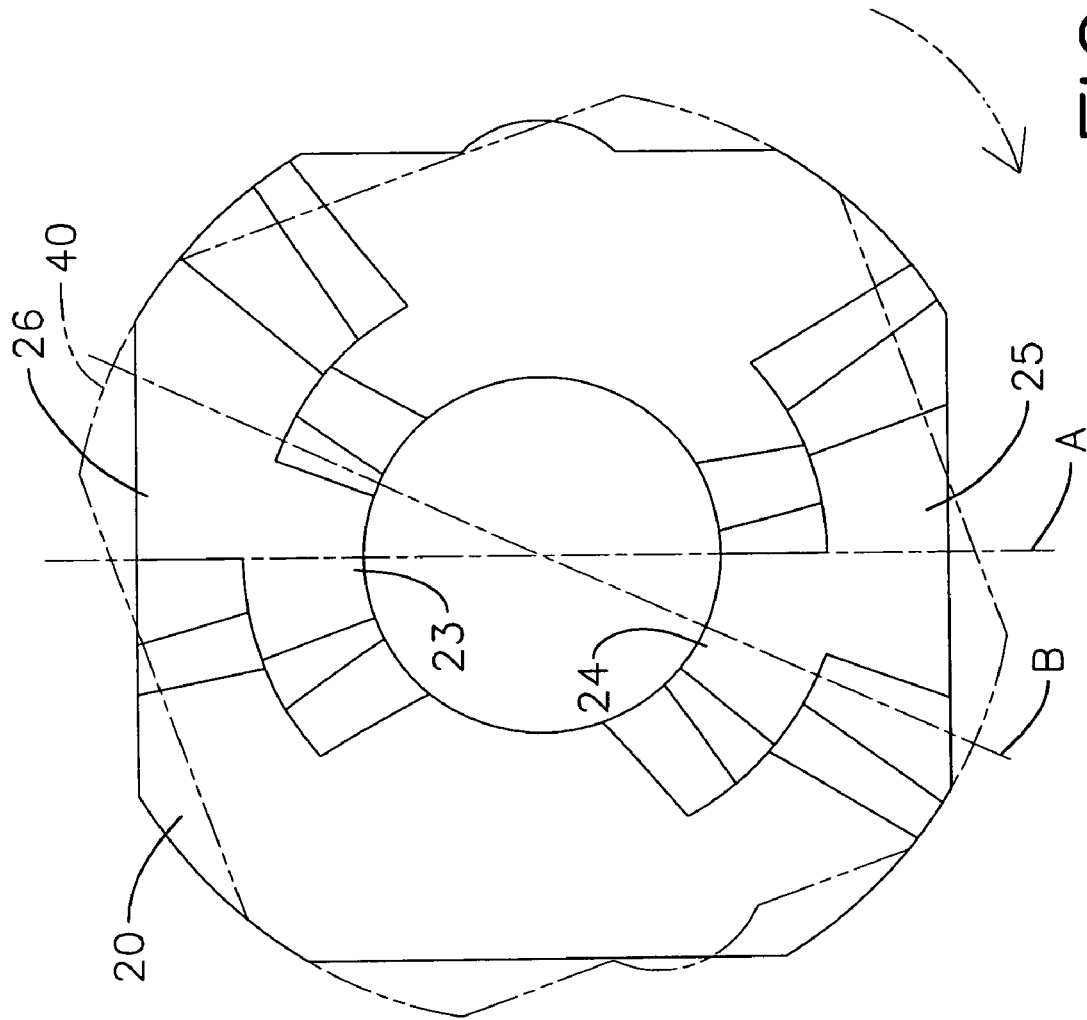
FIG. 4 is an end view of another embodiment of a hinge in accordance with the present invention.

With further reference to FIG. 3, the rotating positioning element (20) is mounted rotatably around the pin (10) and has a front surface, a rear surface, a through hole (21), an optional recess (22), a first detent (23), a second detent (24), a third detent (25) and a fourth detent (26). The rear surface has an inner circular area and an outer circular area. The through hole (21) is formed coaxially through the rotating positioning element (20). The recess (22) is formed in the front surface and corresponds to and holds the head (11) on the pin (10). The first and second detents (23, 24) are formed in the inner circular area of the rear surface. The third and fourth detents (25, 26) are formed on the outer circular area of the rear surface. Each detent (23, 24, 25, 26) has two inclined ends (231, 241, 251, 261) and a centerline (A, B). The centerlines (A) of the first and third detents (23, 25) coincide. The centerlines (B) of the second and fourth detents (24, 26) coincide. With reference to FIG. 3, the centerlines (A) through the first and third detents (23, 25) coincide with the centerlines (B) through the second and fourth detents (24, 26) in one embodiment of the hinge in accordance with the present invention. With reference to FIG. 4, the centerlines (A) through the first and third detents (23, 25) in another embodiment of the hinge in accordance with the present invention do not coincide with the centerlines (B) through the second and fourth detents (24, 26).

The holder (40) is hollow, is mounted around the pin (10), is attached to the rotating positioning element (20) and has a front surface, a rear surface and a recess (41). The front surface of the holder (40) is attached to the rear surface of the rotating positioning element (20). The recess (41) is formed in the front surface of the holder (40).

The stationary positioning element (30) is mounted around the pin (10), corresponds to and is mounted in the recess (41) in the holder (40) and has a front surface, a rear surface, two keys (301), a through hole (31), a first protrusion (32) and a second protrusion (33). The keys (301) are formed on and protrude radially from the stationary positioning element (30), and each key (301) has a front surface. The through hole (31) is formed coaxially through the stationary positioning element (30). The first protrusion (32) is formed on the front surface of the stationary positioning element (30) adjacent to the through hole (31), corresponds to and selectively engages the first and second detents (23, 24) in the rotating positioning element (20) and has two inclined ends (321) and a centerline. The second protrusion (33) is formed on the front surface of the key (301) opposite to the first protrusion (32), corresponds to and selectively engages the third and fourth detents (25, 26) in the rotating positioning element (20) and has two inclined ends (331) and a centerline. The centerline of the second protrusion (33) coincides with the centerline of the first protrusion (32).

The spring (50) is mounted in the holder (40) around the pin (10) and abuts the rear surface of the stationary positioning element (30).

The C-clip (60) is mounted on the pin (10) in the annular groove (12) and abuts the rear surface of the holder (40).

Figure 5:
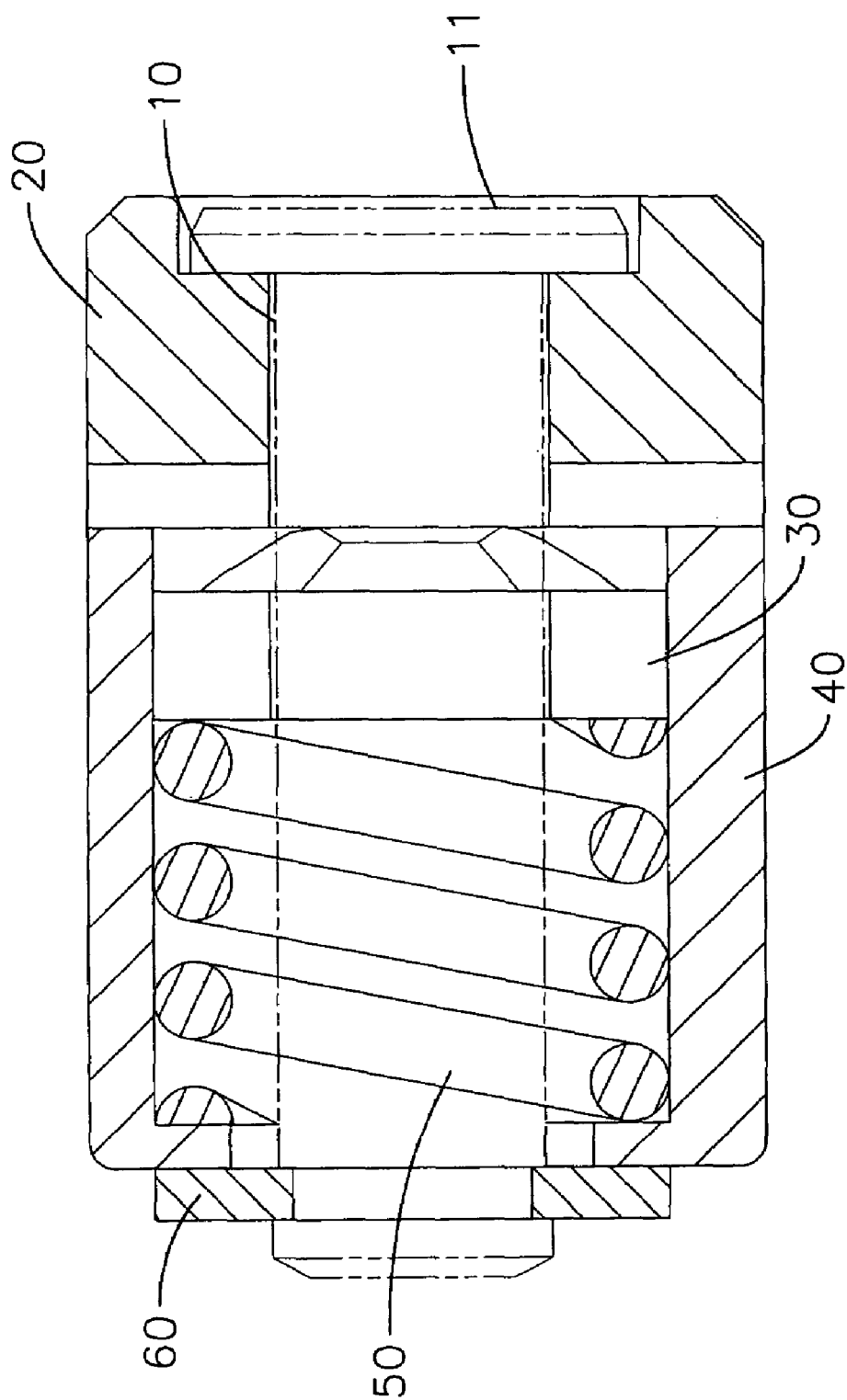
FIG. 5 is a top view in partial section of the hinge in FIG. 1 when the hinge is not held in position.
Figure 6:
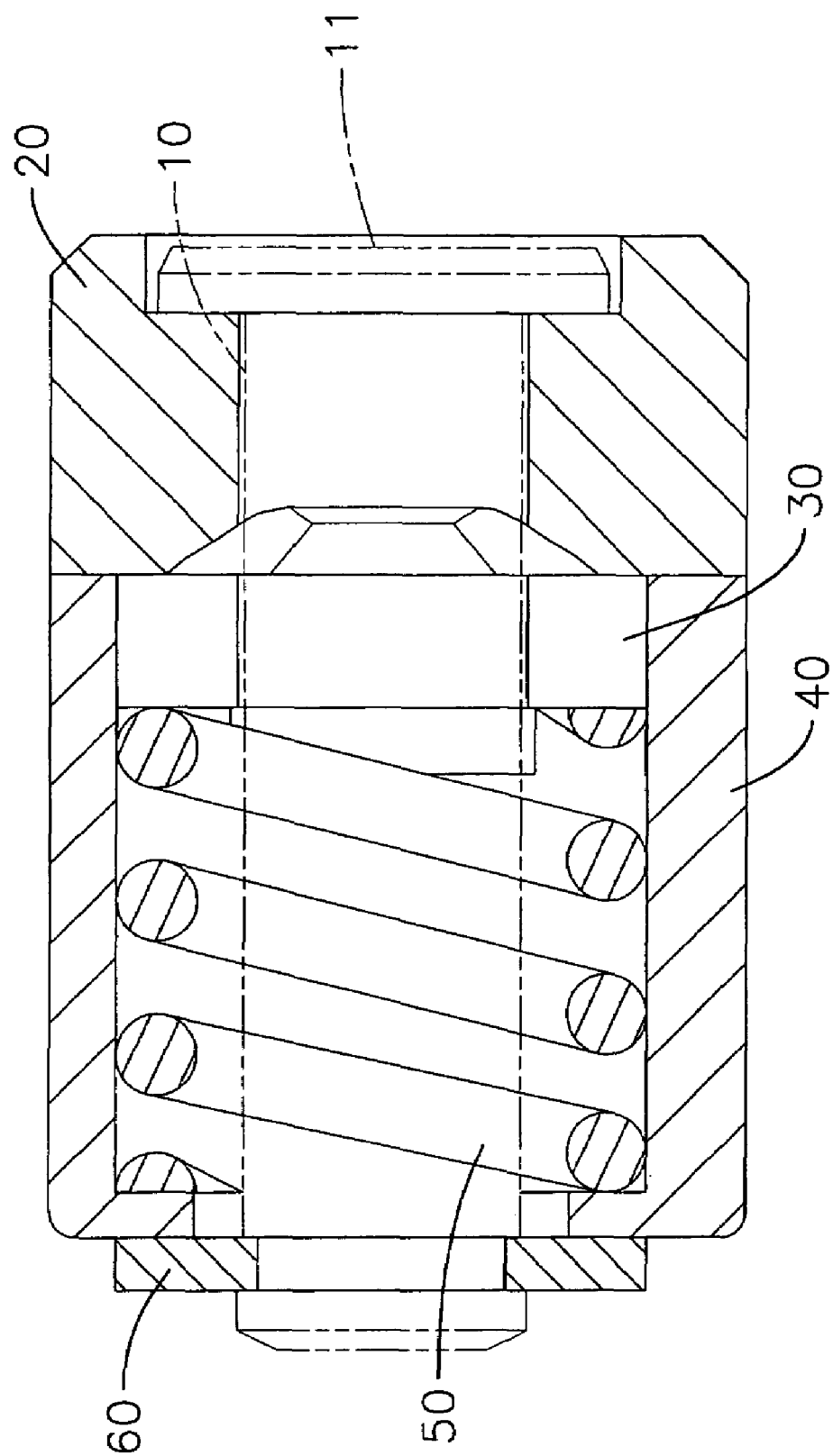
FIG. 6 is a top view in partial section of the hinge in FIG. 1 when the hinge is held in position.

An electrical appliance on which the hinge is used comprises a cover and a base. The hinge is mounted between the cover and the base. The cover is opened and closed by pivoting the hinge. With further reference to FIGS. 5 and 6, the rotating positioning element (20) is rotated when the hinge is pivoted. When the first and third detents (23, 25) respectively engage the first and second protrusions (32, 33), the cover is held in a closed position. When the second and fourth detents (24, 26) respectively engage the first and second protrusions (32, 33), the cover is held in an open position. Therefore, changing the position of the second and fourth detents (24, 26) changes the open position of the cover relative to the base.

Even though numerous characteristics and advantages of the present invention have been set forth in the foregoing description, together with details of the structure and features of the invention, the disclosure is illustrative only. Changes may be made in the details, especially in matters of shape, size, and arrangement of parts within the principles of the invention to the full extent indicated by the broad general meaning of the terms in which the appended claims are expressed.

What is claimed is:

1. A hinge comprising
    a pin having a proximal end and a distal end;
    a rotating positioning element mounted rotatably around the pin and having
        a front surface;
        a rear surface having an inner circular area and an outer circular area;
        a through hole formed coaxially through the rotating positioning element;
        a first detent formed in the inner circular area of the rear surface and having two inclined ends and a centerline;
        a second detent formed on the inner circular area of the rear surface and having two inclined ends and a centerline;
        a third detent formed on the outer circular area of the rear surface and having two inclined ends and a centerline coinciding with the centerline of the first detent; and
        a fourth detent formed on the outer circular area of the rear surface and having two inclined ends and a centerline coinciding with the centerline of the second detent;
    a holder being hollow, mounted around the pin, attached to the rotating positioning element and having
        a front surface attached to the rear surface of the rotating positioning element;
        a rear surface; and
        a recess formed in the front surface of the holder;
    a stationary positioning element mounted around the pin, corresponding to and mounted in the recess in the holder and having
        a front surface;
        a rear surface;
        two keys formed on and protruding radially from the stationary positioning element, and each key having
            a front surface;
        a through hole formed coaxially through the stationary positioning element;
        a first protrusion formed on the front surface of the stationary positioning element adjacent to the through hole, corresponding to and selectively engaging the first and second detents in the rotating positioning element and having two inclined ends and a centerline; and
        a second protrusion formed on the front surface of the key opposite to the first protrusion, corresponding to and selectively engaging the third and fourth detents in the rotating positioning element and having
            two inclined ends; and
            a centerline coinciding with the centerline of the first protrusion; and
    a spring mounted in the holder around the pin and abutting the rear surface of the stationary positioning element.

2. The hinge as claimed in claim 1, wherein
the pin further has
    a head formed on the distal end of the pin; and
    an annular groove formed around the pin near the proximal end;
the rotating positioning element further has a recess formed in the front surface and corresponding to and engaging the head on the pin; and
the hinge further has a C-clip mounted on the pin in the annular groove and abutting the rear surface of the holder.

3. The hinge as claimed in claim 1, wherein the centerlines through the first and third detents coincide with the centerlines through the second and fourth detents.

4. The hinge as claimed in claim 3, wherein
the pin further has
    a head formed on the distal end of the pin; and
    an annular groove formed around the pin near the proximal end;
the rotating positioning element further has a recess formed in the front surface and corresponding to and engaging the head on the pin; and
the hinge further has a C-clip mounted on the pin in the annular groove and abutting the rear surface of the holder.

5. The hinge as claimed in claim 1, wherein the centerlines through the first and third detents do not coincide with the centerlines through the second and fourth detents.

6. The hinge as claimed in claim 3, wherein
the pin further has
    a head formed on the distal end of the pin; and
    an annular groove formed around the pin near the proximal end;
the rotating positioning element further has a recess formed in the front surface and corresponding to and engaging the head on the pin; and
the hinge further has a C-clip mounted on the pin in the annular groove and abutting the rear surface of the holder.

* * * * *